United States Patent
Atobe et al.

(10) Patent No.: US 11,196,610 B2
(45) Date of Patent: Dec. 7, 2021

(54) TRANSFER CONTROL APPARATUS, VEHICLE, AND TRANSFER CONTROL METHOD

(71) Applicant: Mitsubishi Electric Corporation, Tokyo (JP)

(72) Inventors: Yuta Atobe, Tokyo (JP); Madoka Baba, Tokyo (JP); Daisuke Kawakami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 649 days.

(21) Appl. No.: 15/767,560

(22) PCT Filed: Dec. 4, 2015

(86) PCT No.: PCT/JP2015/084177
§ 371 (c)(1),
(2) Date: Apr. 11, 2018

(87) PCT Pub. No.: WO2017/094190
PCT Pub. Date: Jun. 8, 2017

(65) Prior Publication Data
US 2018/0302265 A1 Oct. 18, 2018

(51) Int. Cl.
*H04L 29/06* (2006.01)
*H04L 29/08* (2006.01)
(Continued)

(52) U.S. Cl.
CPC ............ *H04L 29/06* (2013.01); *B60R 16/023* (2013.01); *H04L 67/12* (2013.01); *H04L 2012/40273* (2013.01)

(58) Field of Classification Search
CPC ..................... H04L 29/06; H04L 67/12; H04L 2012/40273; B60R 16/023
See application file for complete search history.

(56) References Cited

U.S. PATENT DOCUMENTS 7,996,098 B2 * 8/2011 Dickinson ............. H04L 67/303
  700/80
8,705,527 B1 * 4/2014 Addepalli ............. H04W 48/02
  370/389

(Continued)

FOREIGN PATENT DOCUMENTS

JP  5-197652 A  8/1993
JP  2001-14170 A  1/2001
(Continued)

OTHER PUBLICATIONS

International Search Report issued in PCT/JP2015/084177 (PCT/ISA/210), dated Jan. 26, 2016.

*Primary Examiner* — Henry Tsai
*Assistant Examiner* — Aurangzeb Hassan
(74) *Attorney, Agent, or Firm* — Birch, Stewart, Kolasch & Birch, LLP

(57) ABSTRACT

In a transfer control apparatus (100), each function unit (110) specifies a transfer time and a device ID, and makes a transfer request of device data. A first control unit (111), in response to the transfer request from a request source being any of a plurality of function units (110), transfers the device data between a first area (121) corresponding to the request source, and a second area (122) corresponding to a combination of the transfer time and the device ID specified by the request source. A second control unit (112) transfers, when a second area (122) corresponding to a transfer time being same as a time notified by a timer (113) exists, the device data between that second area (122), and a third area (123) corresponding to the same device ID as that second area (122).

6 Claims, 11 Drawing Sheets

(51) Int. Cl.
  *B60R 16/023* (2006.01)
  *H04L 12/40* (2006.01)

(56) References Cited

U.S. PATENT DOCUMENTS

| | | | | |
|---|---|---|---|---|
| 8,848,608 | B1* | 9/2014 | Addepalli | H04L 69/18 370/328 |
| 2006/0108956 | A1* | 5/2006 | Clark | B60L 7/26 318/139 |
| 2008/0186870 | A1* | 8/2008 | Butts | H04L 43/0847 370/252 |
| 2009/0120268 | A1* | 5/2009 | Joung | G06F 3/04886 84/609 |
| 2010/0030992 | A1* | 2/2010 | Fienblit | G06F 3/0605 711/166 |
| 2014/0337829 | A1* | 11/2014 | Ito | H04L 41/0846 717/175 |
| 2016/0191572 | A1* | 6/2016 | Joy | H04L 12/413 370/402 |
| 2016/0344703 | A1* | 11/2016 | Sharma | H04L 63/0428 |
| 2017/0063994 | A1* | 3/2017 | Lei | H04W 12/0609 |
| 2017/0192770 | A1* | 7/2017 | Ujiie | G06F 11/1433 |
| 2018/0151004 | A1* | 5/2018 | Gintz | H04W 4/48 |
| 2018/0307840 | A1* | 10/2018 | David | H04L 63/101 |
| 2019/0044785 | A1* | 2/2019 | Vadivelu | H04L 29/06 |
| 2019/0259223 | A1* | 8/2019 | Sangameswaran | H04L 67/34 |
| 2020/0125858 | A1* | 4/2020 | Bauer | B60R 16/03 |

FOREIGN PATENT DOCUMENTS

| | | |
|---|---|---|
| JP | 2001-229136 A | 8/2001 |
| JP | 2002-82896 A | 3/2002 |
| JP | 2009-265843 A | 11/2009 |
| JP | 2010-231407 A | 10/2010 |
| JP | 2011-14033 A | 1/2011 |
| JP | 2012-128788 A | 7/2012 |

* cited by examiner

Fig. 2

| DEVICE ID | TRANSFER TIME | | | |
|---|---|---|---|---|
| | t1 | t2 | t3 | t4 |
| 200a<br>200b<br>200c | 0x00<br>0x0000<br>0x1111 | 0x02<br>0xF0F0<br>0x0000 | 0x04<br>0x0F0F<br>0x2222 | 0x06<br>0xFFFF<br>0x3333 |
| | 122a | 122b | 122c | 122d |

Fig. 3

| DEVICE ID | DATA VALUE |
|---|---|
| 200a | 0x06 |
| 200b | 0xFFFF |
| 200c | 0x3333 |

Fig. 9

| DEVICE ID | TRANSFER TIME | DEVICE DATA |
|---|---|---|
| 200a | t1 | 0x00 |
| 200a | t3 | 0x02 |
| 200b | t2 | 0x0000 |
| 200b | t3 | 0xF0F0 |
| 200b | t4 | 0x0000 |
| 200c | t1 | 0x1111 |

122

| TRANSFER TIME | DEVICE ID |
|---|---|
| t1 | 200a |
| t1 | 200c |
| t2 | 200b |
| t3 | 200a |
| t3 | 200b |
| t4 | 200b |

TRANSFER CONTROL APPARATUS, VEHICLE, AND TRANSFER CONTROL METHOD

TECHNICAL FIELD

The present invention relates to a transfer control apparatus, a vehicle, and a transfer control method.

BACKGROUND ART

Conventionally, in-vehicle control devices called electronic control units (ECUs) have been introduced originating with the increase in needs of performance improvement in vehicle control. Devices, such as a sensor, an actuator, etc. are connected to ECUs. ECUs have functions to access the devices connected, and to perform operations.

The number of ECUs to be mounted on a vehicle has been increased with the increase of the number of devices to be controlled. Nowadays, as many as 50 to 100 pieces of ECUs are mounted on each vehicle. Further, as the kinds of controllable devices expand, cooperative control over each device is desired. Thus, a plurality of ECUs are connected by a network, such as a controller area network (CAN), etc.

Patent Literature 1 discloses a technique of an input and output device connected to a CAN to process output to a plurality of ECUs. In the technique, the input and output device stores data output from a plurality of devices in a database. The input and output device outputs data needed by each ECU from the database at a desired point of time.

CITATION LIST

Patent Literature

Patent Literature 1: JP 2010-231407 A

SUMMARY OF INVENTION

Technical Problem

In recent years, the number of loaded ECUs for each vehicle, and traffic on networks have almost reached limits, and it has become an issue for further improvement in the performance of vehicle control. With respect to the issue, it is considered to integrate functions realized by the plurality of ECUs into a single ECU in accordance with the recent improvement in calculation capability. By the integration of functions, it is possible to reduce the number of loaded ECUs for each vehicle, and the traffic on networks.

However, by the integration of the plurality of functions into the single ECU, a point of time of device access in each function may deviate from a desired point of time. In particular, when the plurality of functions are integrated into an ECU whereon a central processing unit (CPU) is mounted, deviation in the point of time of device access is likely to occur due to resource competition in the CPU. When deviation in the point of time of device access occurs, it becomes difficult to handle device data intended by a designer in each function.

By the technique disclosed in Patent Literature 1, it is necessary to perform input and output processing at a desired point of time, even while processing related to functions realized by each ECU is performed. Therefore, in each ECU, it is necessary to set an execution priority of the input and output processing to the highest degree of priority. However, if it is attempted to integrate functions requiring input and output processing at very short intervals of inverter control, etc., the input and output processing nearly monopolizes the CPU resource, and the performance of the processing related to primary functions degrades significantly.

The present invention is aimed at making input and output processing of device data executable at a desired point of time while maintaining the performance of processing related to primary functions.

Solution to Problem

A transfer control apparatus according to one aspect of the present invention including:

a plurality of function units to specify a transfer time of device data being any one of data input into a device located outside, and data output from the device, and make a transfer request of the device data;

a first control unit to transfer, in response to a transfer request from a request source being any one of the plurality of function units, the device data between a first area corresponding to the request source out of a plurality of first areas provided for and accessed by respective ones of the plurality of function units, and a second area corresponding to a transfer time specified by the request source out of a plurality of second areas provided for respective transfer times specified by the plurality of function units; and a second control unit to include a timer to notify a time, and transfer, when a second area corresponding to a transfer time being same as the time notified by the timer exists, the device data between that second area, and at least one third area accessed by the device.

Advantageous Effects of Invention

In the present invention, transfer processing of device data using a timer is performed independently of processing of function units. Therefore, by the present invention, input and output processing of device data is made executable at a desired point of time while maintaining the performance of processing related to primary functions.

BRIEF DESCRIPTION OF DRAWINGS

FIG. 2 is a table illustrating an example of a second area of the transfer control apparatus according to the first embodiment;

FIG. 3 is a table illustrating an example of a third area of the transfer control apparatus according to the first embodiment;

FIG. 9 is a table illustrating an example of a second area of the transfer control apparatus according to the second embodiment;

DESCRIPTION OF EMBODIMENTS

Hereinafter, explanation of the present embodiment will be made using diagrams. Note that, in each diagram, the same parts or corresponding parts are denoted by the same signs. In the explanation of the embodiment, description of the same parts or corresponding parts will be omitted or simplified as needed.

First Embodiment

A configuration of a device according to the present embodiment, an operation of the device according to the present embodiment, and effects of the present embodiment will be described in turn.

* Explanation of Configuration *

Figure 1:
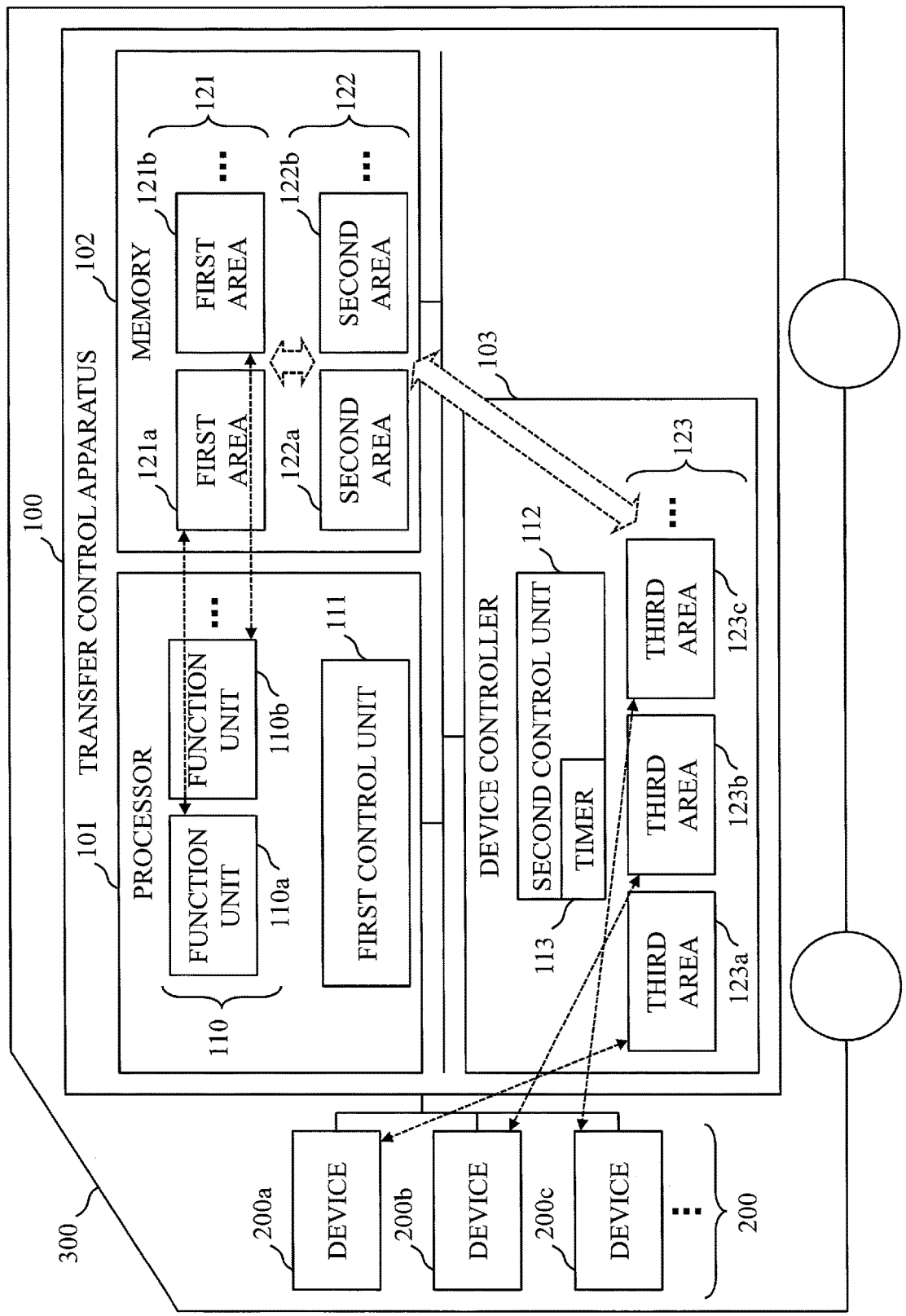
FIG. 1 is a block diagram illustrating a configuration and an installation example of a transfer control apparatus according to a first embodiment.

With reference to FIG. 1, a configuration of a transfer control apparatus 100 as the device according to the present embodiment will be described. An installation example of the transfer control apparatus 100 is also described.

The transfer control apparatus 100 is mounted on a vehicle 300 together with at least one device 200. The transfer control apparatus 100 may be mounted on an arbitrary object as long as it is an object whereon some kind of device 200 is mounted.

The device 200 is, specifically, a sensor or an actuator. The number of the device 200 may be appropriately changed, whereas in FIG. 1, a device 200a, a device 200b and a device 200c are illustrated as examples of the devices 200.

The transfer control apparatus 100 is a computer. The transfer control apparatus 100 is equipped with hardware components such as a processor 901, a memory 102 and a device controller 103. The processor 901 is connected to other hardware components via a signal line to control the other hardware components.

The transfer control apparatus 100 is equipped with a plurality of function units 110, a first control unit 111 and a second control unit 112 as functional elements.

The functions of the plurality of function units 110 and the first control unit 111 are realized by software. The number of the function units 110 may be appropriately changed, whereas in FIG. 1, a function unit 110a and a function unit 110b are illustrated as examples of the function units 110.

The function of the second control unit 112 is realized by the device controller 103. The second control unit 112 includes a timer 113 to notify clock time.

The transfer control apparatus 100 includes a plurality of the first areas 121, a plurality of the second areas 122 and a plurality of the third areas 123 as areas to store device data. The device data is any of data to be input into the devices 200 outside of the transfer control apparatus 100 from the transfer control apparatus 100, or data to be output to the transfer control apparatus 100 from the devices 200.

The first areas 121 are provided for respective function units 110. Each of the first areas 121 is accessed by the corresponding function unit 110. In the present embodiment, each of the first areas 121 is not accessed by the function units 110 other than the corresponding function unit 110. Each of the first areas 121 is realized by the memory 102. The number of the first areas 121 corresponds to the number of the function units 110, and in FIG. 1, the first area 121a corresponding to the function unit 110a, and the first area 121b corresponding to the function unit 110b are illustrated as examples of the first areas 121.

The second areas 122 are provided for respective transfer times of device data. The transfer time is, as described below, specified by respective function units 110 when a transfer request of device data is made. Each of the second areas 122 is realized by the memory 102. The number of the second areas 122 may be appropriately changed, whereas in FIG. 1, a second area 122a and a second area 122b are illustrated as examples of the second areas 122.

The examples of the second areas 122 are illustrated in FIG. 2.

In the present example, the second areas 122 are provided for respective combinations of a transfer time and a device identifier (ID). The device ID is an identifier to identify a device 200. The device ID is specified when a transfer request of device data is made by each of the function units 110 as with the transfer time. The second areas 122 are, specifically, areas to store device data in a table consisting of a column wherein device IDs are stored, and a column divided for each transfer time, wherein the device data is stored.

In the present example, transfer times are managed in four stages of "t1" through "t4." Therefore, in FIG. 2, the second area 122a corresponding to the transfer time "t1," the second area 122b corresponding to the transfer time "t2," a second area 122c corresponding to the transfer time "t3," and a second area 122d corresponding to the transfer time "t4" are illustrated as the second areas 122. As a specific example of the second area 122d, a second area 122da corresponding to a combination of the transfer time "t4" and the device 200a, a second area 122db corresponding to a combination of the transfer time "t4" and the device 200b, and a second area 122dc corresponding to a combination of the transfer time "t4" and the device 200c are illustrated.

The transfer time may be managed as a periodic time, or may be managed as a point of time. If the transfer time "t4" is managed as a periodic time of one second, every time one second elapses from certain points of time, device data stored in the second area 122d corresponding to the transfer time "t4" is updated, or transferred to the devices 200. If the transfer time "t4" is managed as a point of occurrence time of a specific event, when such an event occurs, device data stored in the second area 122d corresponding to the transfer time "t4" is updated, or transferred to the devices 200. Whether the device data is updated or transferred at the transfer time is set beforehand for each device 200. Specifically, when a device 200 is a sensor, the device data is updated, and when a device 200 is an actuator, the device data is transferred.

The third areas 123 are provided for respective devices 200. Each of the third areas 123 is accessed by the corresponding device 200. In the present embodiment, each of the third areas 123 is not accessed by the devices 200 other than the corresponding device 200. Each of the third areas 123 is realized by a register in the device controller 103; however, each of the third areas 123 may be realized by the memory 102, or another storage medium. The number of the third areas 123 corresponds to the number of the devices 200, whereas in FIG. 1, a third area 123a corresponding to the device 200*a,* a third area 123*b* corresponding to the device 200*b,* and a third area 123*c* corresponding to the device 200*c* are illustrated as examples of the third areas 123.

The examples of the third areas 123 are illustrated in FIG. 3.

In the present example, the third areas 123 are provided for respective device IDs. The device data stored in the third areas 123 is updated to the latest data with a clock period of the register in the device controller 103, or read out into the devices 200 with a clock period. Whether device data is updated or read out with a clock period is set beforehand for each device 200. Specifically, when a device is a sensor, device data is updated, and when a device 200 is an actuator, device data is read out.

The processor 101 is an integrated circuit (IC) to perform processing. The processor 101 is, for example, a CPU.

The memory 102 is, for example, a flash memory or a random access memory (RAM).

The device controller 103 is, specifically, a single circuit, a composite circuit, a processor that is made into a program, a processor that is made into a parallel program, a logic IC, a gate array (GA), an application specific integrated circuit (ASIC), or a field-programmable gate array (FPGA).

The transfer control apparatus 100 is equipped with a communication device as a hardware component, which is not illustrated in the diagrams.

The communication device includes a receiver to receive data from the devices 200, and a transmitter to transmit data to the devices 200. The communication device is connected to the devices 200 via a network, such as a CAN, etc. The communication device is, for example, a communication chip or a network interface card (NIC).

The transfer control apparatus 100 is equipped with at least either of an input device or a display as a hardware component.

The input device is, for example, a mouse, a keyboard, or a touch panel.

The display is, for example, a liquid crystal display (LCD).

The memory 102 stores a program to realize the functions of the plurality of function units 110 and the first control unit 111. The program is read into the processor 101, and executed by the processor 101. An operating system (OS) is also stored in the memory 102. The processor 101 executes the program to realize the functions of the plurality of function units 110 and the first control unit 111 while executing the OS.

The program to realize the functions of the plurality of function units 110 and the first control unit 111, and the OS may be stored in an auxiliary storage device. The auxiliary storage device is, for example, a flash memory or a hard disk drive (HDD). The program and the OS stored in the auxiliary storage device are loaded into the memory 102, and executed by the processor 101.

The transfer control apparatus 100 may be equipped with one processor 101, or may be equipped with a plurality of processors 101. The plurality of processors 101 may cooperatively execute the program to realize the functions of the plurality of function units 110 and the first control unit 111.

The information, data, signal values and variable values indicating the results of the processing by the plurality of function units 110 and the first control unit 111 are stored in the memory 102, the auxiliary storage device, or the register in the processor 101 or a cache memory.

The program to realize the function of the plurality of function units 110 and the first control unit 111 may be stored in a portable recording medium, such as a magnetic disc, a flexible disk, an optical disk, a compact disc, a Blue-ray (registered trademark) disc, or a digital versatile disc (DVD), etc.

* Explanation of Operation *

Hereinafter, the operation of the transfer control apparatus 100 being the device according to the present embodiment will be described. The operation of the transfer control apparatus 100 corresponds to a transfer control method according to the present embodiment.

Figure 4:
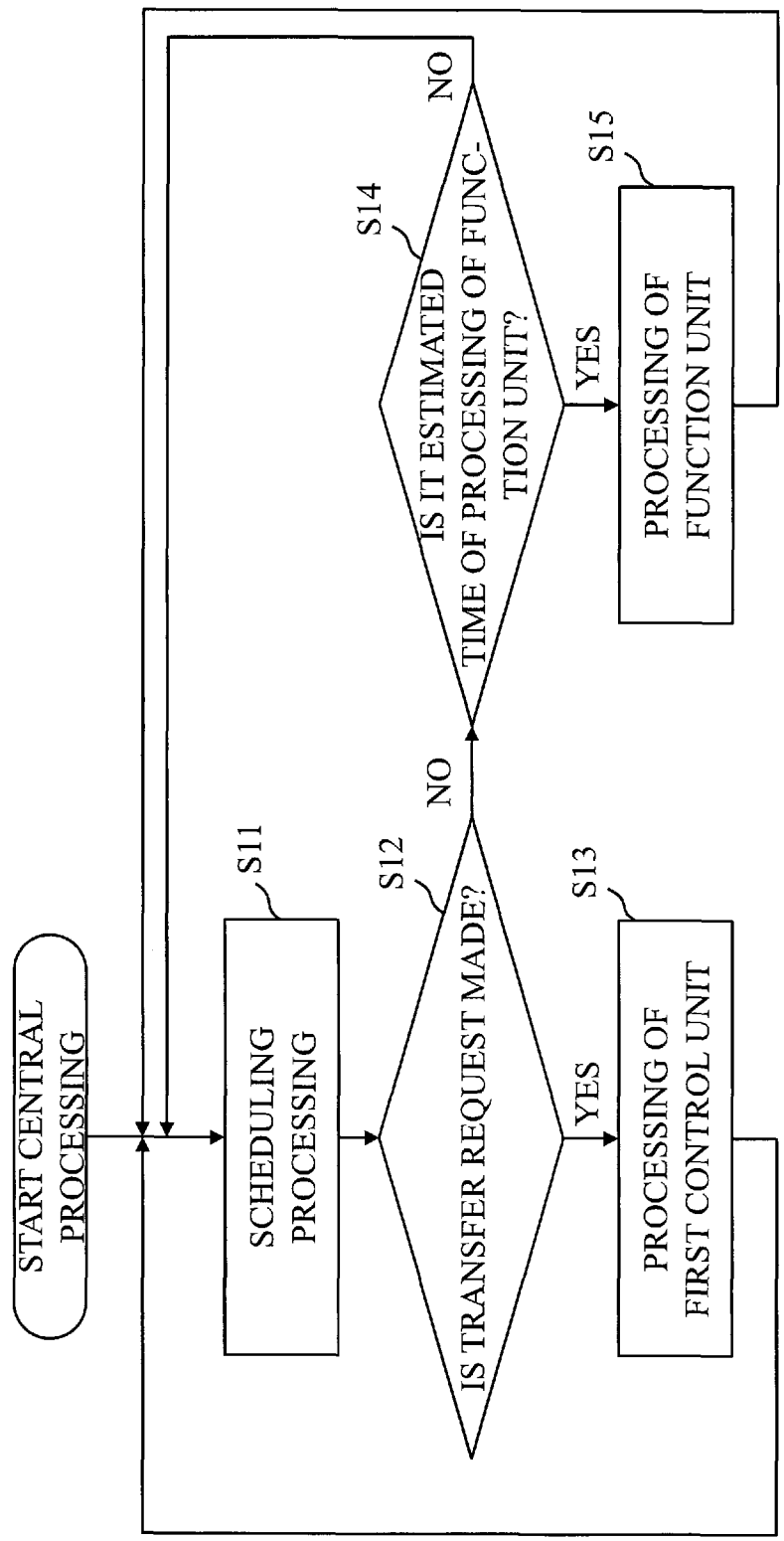
FIG. 4 is a flowchart illustrating an operation of a processor of the transfer control apparatus according to the first embodiment.

The operation of the processor 101 will be described with reference to FIG. 4.

The processor 101 is started when power is applied to the transfer control apparatus 100. When the processor 101 is started, the plurality of function units 110 are started.

In a step S11, the processor 101 performs scheduling processing, and makes an execution schedule of the function units 110. The processing of the function units 110 is processing related to original functions of the function units 110. As specific examples of the original functions, there are functions of performing operations using device data obtained from sensors, and of generating device data to control an actuator based on the results of the operations, and so on.

In order to perform the processing related to the original functions, each of the function units 110 makes a transfer request of device data by specifying a transfer time of the device data, as required. In the present embodiment, each of the function units 110 specifies not only the transfer time of the device data but also a device ID at the time when the transfer request of the device data is made. That is, a request source being a function unit 110 to make the transfer request let a device ID to identify a device 200 to be accessed and a transfer time of device data be included in a transfer request. Although it is optional, the request source further makes a transfer direction of device data, and position information to indicate a position of a first area 121 in the memory 102 be included in a transfer request. When the first control unit 111 stores a definition of a correspondence relation between a device 200 and a transfer direction, it is unnecessary to make the transfer direction be included in the transfer request. When the first control unit 111 stores a definition of a correspondence relation between a function unit 110 and the position of the first area 121, it is unnecessary to make the position information be included in the transfer request.

When the transfer direction is a direction toward the device 200, i.e., when output of device data from the request source is requested, the request source stores data to be input into the device 200 as device data in the first area 121 corresponding to the request source.

In a step S12, the processor 101 judges whether there is a transfer request of device data from the function units 110.

When there is the transfer request in a step S12, in a step S13, the processor 101 starts the first control unit 111, and make the first control unit 111 perform processing as described below.

When there is no transfer request in the step S12, in a step S14, the processor 101 judges whether an estimated time of processing by any of the function units 110 has arrived based on the processing result of the step S11.

When the estimated time of processing by any of the function units 110 has arrived in the step S14, in a step S15, the processor 101 makes a corresponding function unit 110 perform processing of the function unit 110.

When the estimated time of processing by any of the function units 110 has not arrived, the flow returns to the step S11.

Figure 5:
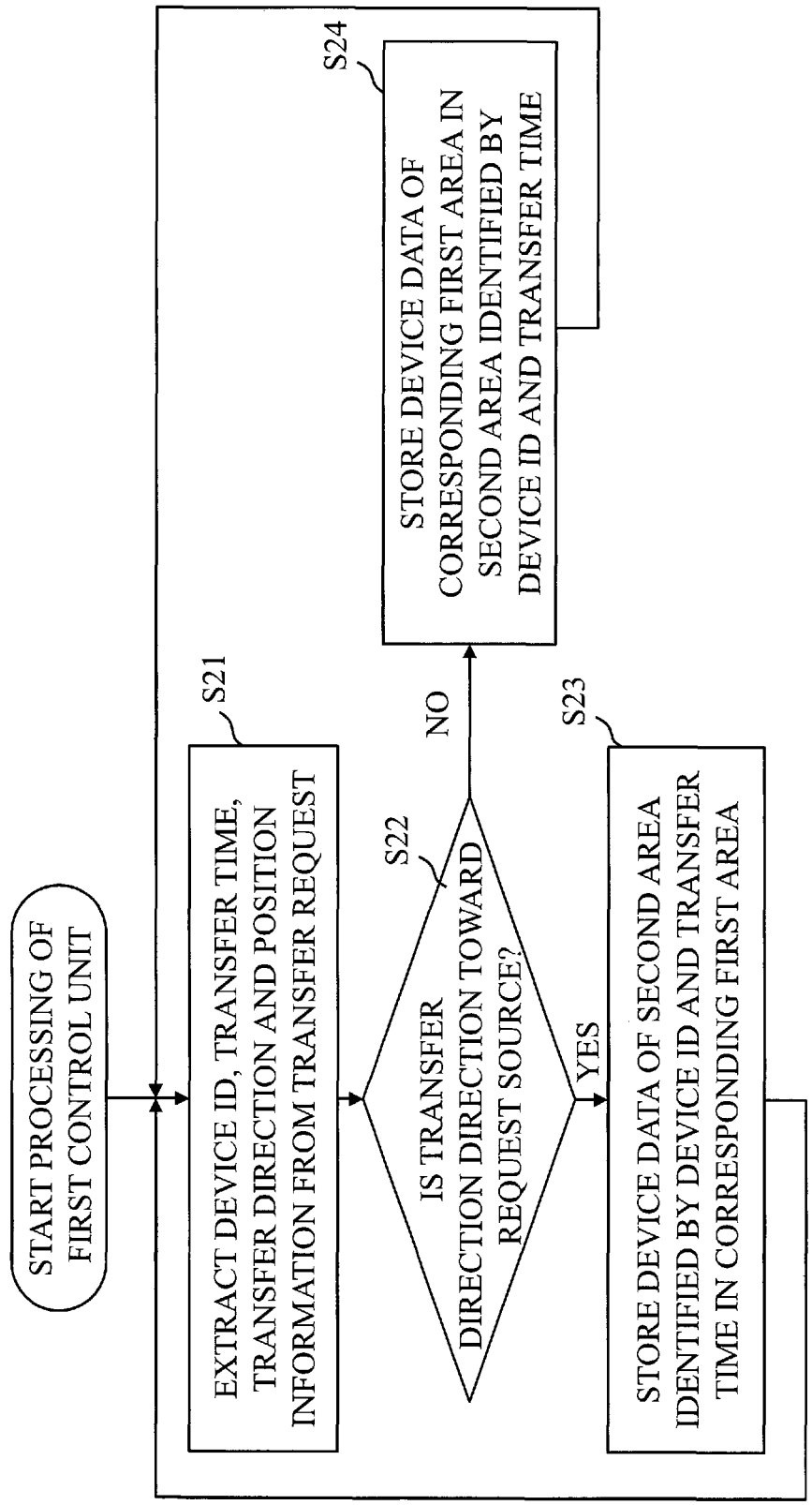
FIG. 5 is a flowchart illustrating an operation of a first control unit of the transfer control apparatus according to the first embodiment.

With reference to FIG. 5, the operation of the first control unit 111 in the step S13 will be described.

The first control unit 111 is started by the processor 101.

In a step S21, the first control unit 111 receives a transfer request from a request source. The first control unit 111 extracts, from the transfer request, a device ID to identify a device 200 to be accessed, a transfer time of device data, a transfer direction of the device data, and position information indicating a position of a first area 121 in the memory 102.

In a step S22, the first control unit 111 judges whether the transfer direction extracted in the step S21 is a direction toward the request source.

When the transfer direction is the direction toward the request source in the step S22, i.e., when input of the device data into the request source is requested, in a step S23, the first control unit 111 transfers device data of a second area 122 to the first area 121.

When the transfer direction is the direction toward the device 200 in the step S22, i.e., when output of device data from the request source is requested, in a step S24, the first control unit 111 transfers the device data of the first area 121 to the second area 122.

In the step S23 and the step S24, the first control unit 111 identifies the first area 121 by the position information extracted in the step S21, and identifies the second area 122 by the combination of the device ID and the transfer time extracted in the step S21.

As described above, in response to the transfer request from the request source being any of the plurality of function units 110, the first control unit 111 transfers device data between the first area 121 corresponding to the request source of the plurality of the first areas 121, and the second area 122 corresponding to the transfer time specified by the request source of the plurality of the second areas 122. Specifically, in response to the transfer request from the request source, the first control unit 111 transfers the device data between the first area 121 corresponding to the request source, and the second area 122 corresponding to the combination of the transfer time and the device ID specified by the request source.

When the transfer direction is the direction toward the request source, i.e., when input of the device data into the request source is requested, in response to the transfer request from the request source, the first control unit 111 transfers the device data from the second area 122 corresponding to the combination of the transfer time and the device ID specified by the request source, to the first area 121 corresponding to the request source. The request source obtains the device data from the first area 121 corresponding to the request source.

When the transfer direction is the direction toward the device 200, i.e., when output of the device data from the request source is requested, in response to the transfer request from the request source, the first control unit 111 transfers the device data from the first area 121 corresponding to the request source, to the second area 122 corresponding to the combination of the transfer time and the device ID specified by the request source.

Figure 6:
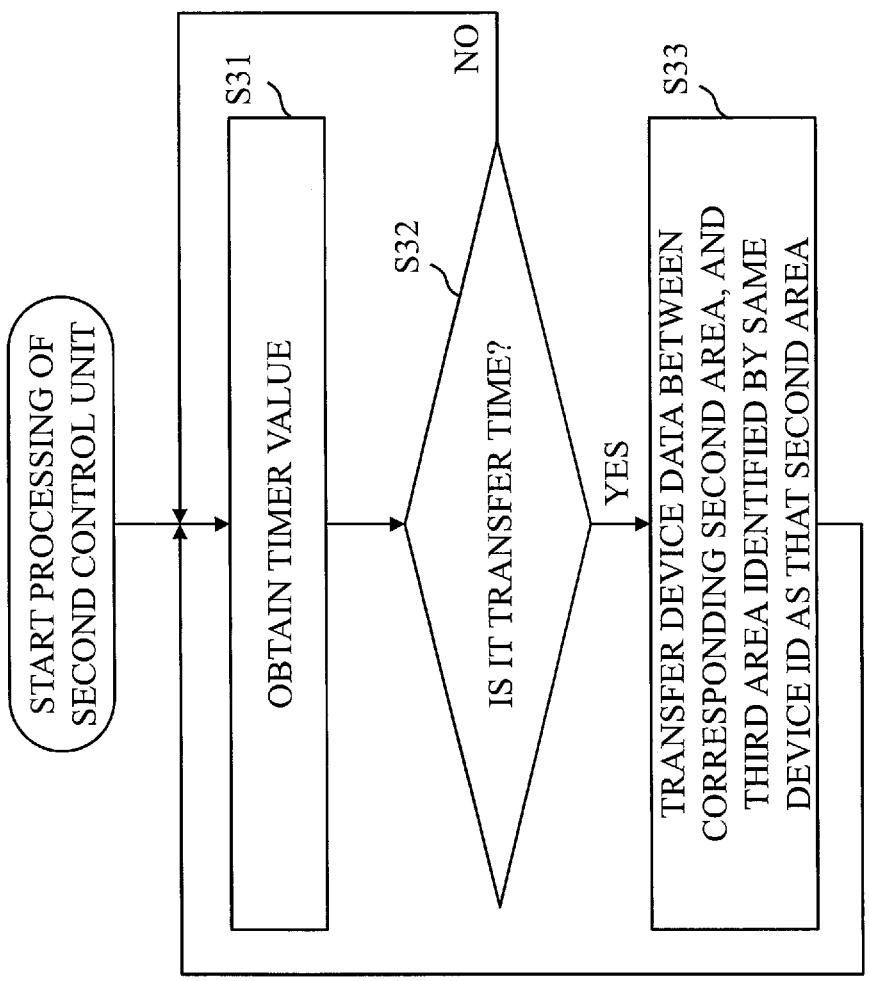
FIG. 6 is a flowchart illustrating an operation of a second control unit of the transfer control apparatus according to the first embodiment.

With reference to FIG. 6, the operation of the device controller 103, particularly the operation of the second control unit 112, will be described.

In a step S31, the second control unit 112 obtains a timer value indicating the time notified by the timer 113.

In a step S32, the second control unit 112 judges whether the time of the timer value obtained in the step S31 is a transfer time corresponding to any of the second areas 122.

The time of the timer value in the step S32 is the transfer time corresponding to any of the second areas 122, i.e., when there is a second area 122 corresponding to the transfer time being the same as the time notified by the timer 113, in a step S33, the second control unit 112 transfers device data between that second area 122, and a third area 123 corresponding to the same device ID as that second area 122.

Each of the devices 200 outputs device data and stores the device data in the third area 123, or obtains device data from the third area 123 and uses the device data, with a clock period of the register in the device controller 103. That is, as described above, it is set beforehand for each device 200 whether device data stored in the third areas 123 is updated, or read out. Thus, when there is a second area 122 corresponding to the transfer time being same as the time notified by the timer 113, the second control unit 112 transfers device data to that second area 122, from a third area 123 corresponding to the same device ID as that second area 122, the device ID further being the device ID of the device 200 to be updated the device data. Further, when there is a second area 122 corresponding to the transfer time being same as the time notified by the timer 113, the second control unit 112 transfers device data from that second area 122, to a third area 123 corresponding to the same device ID as that second area 122, the device ID being the device ID of the device 200 to be read out the device data.

When the time of the timer value in the step S32 is not any transfer time corresponding to any of the second areas 122, i.e., when there is no second are 122 corresponding to a transfer time being same as the time notified by the timer 113, the flow returns to the step S31.

* Explanation of Effects of Present Embodiment *

In the present embodiment, the transfer processing of device data using the timer 113 is performed independently of the processing by the function units 110. Therefore, by the present embodiment, the input and output processing of the device data can be performed at a desired point of time while maintaining the performance of the processing related to the original functions.

In the present embodiment, the plurality of function units 110 and the first control unit 111 are operated by the processor 101, and the second control unit 112 is operated by the device controller 103. That is, the plurality of function units 110 and the first control unit 111 are operated by different hardware components from the second control unit 112. Therefore, it is possible to prevent the transfer processing using the timer 113 from competing against the other processing for resources. Even when functions that require device access at very short intervals of inverter control, etc. are integrated into the processor 101, device access is processed by a different hardware component from the processor 101; hence, the performance of the processing related to the original functions can be enhanced.

* Other Configuration *

In the present embodiment, the functions of the plurality of function units 110 and the first control unit 111 are realized by software; however, the functions of the plurality of function units 110 and the first control unit 111 may be realized by a hardware component as a variation. With respect to the variation, mainly the difference from the present embodiment will be described.

Figure 7:
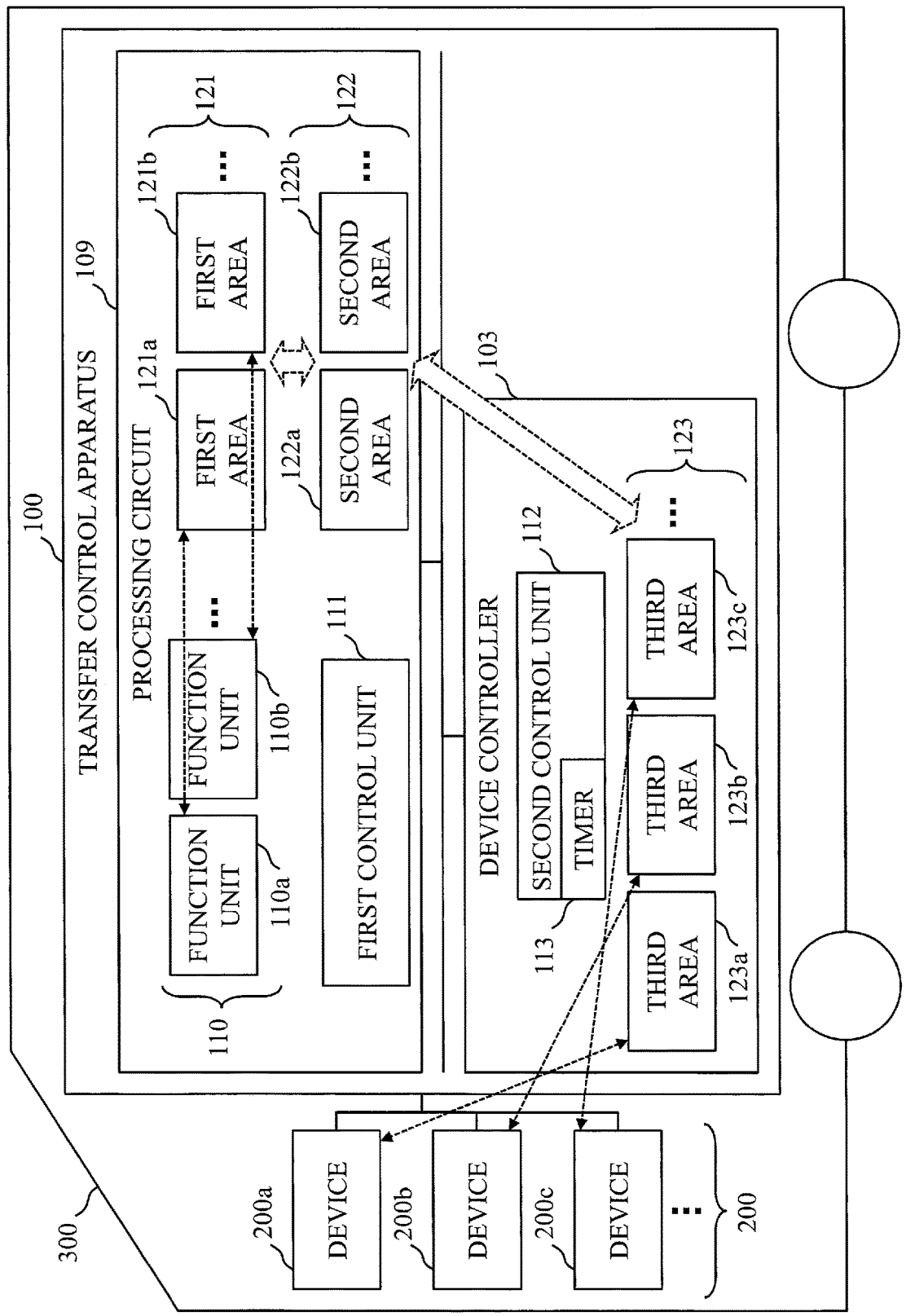
FIG. 7 is a block diagram illustrating a configuration and an installation example of a transfer control apparatus according to a variation of the first embodiment.

With reference to FIG. 7, a configuration of a transfer control apparatus 100 according to a variation of the present embodiment will be described.

The transfer control apparatus 100 is equipped with hardware components, such as a processing circuit 109, a device controller 103, etc.

The processing circuit 109 is a dedicated electronic circuit to realize functions of a plurality of function units 110 and a first control unit 111. The processing circuit 109 is, specifically, a single circuit, a composite circuit, a processor that is made into a program, a processor that is made into a parallel program, a logic IC, a GA, an ASIC, or an FPGA.

The functions of the plurality of function units 110 and the first control unit 111 may be realized by one processing circuit 109, or may be realized dispersedly by a plurality of processing circuits 109.

As another variation, the functions of the plurality of function units 110 and the first control unit 111 may be realized by a combination of software and a hardware component. That is, a part of the functions of the plurality of function units 110 and the first control unit 111 may be realized by a dedicated hardware component, and the remaining functions may be realized by software.

The processor 101, the memory 102 and the processing circuit 109 are collectively referred to as "processing circuitry." That is, even when the configuration of the transfer control apparatus 100 is the configuration as illustrated in any of FIG. 1 and FIG. 7, the functions of the plurality of function units 110 and the first control unit 111 are realized by the processing circuitry.

The functions of the second control unit 112 may be realized by a combination of software and a hardware component. That is, a part of the functions of the second control unit 112 such as the timer 113, etc. may be realized by a dedicated hardware component, and the remaining functions may be realized by software.

The "units" may be replaced with "steps", "procedures" or "processes."

Second Embodiment

A configuration of a device according to the present embodiment, an operation of the device according to the present embodiment, and effects of the present embodiment will be described in turn. With respect to the present embodiment, mainly the difference from the first embodiment will be described.

* Explanation of Configuration *

Figure 8:
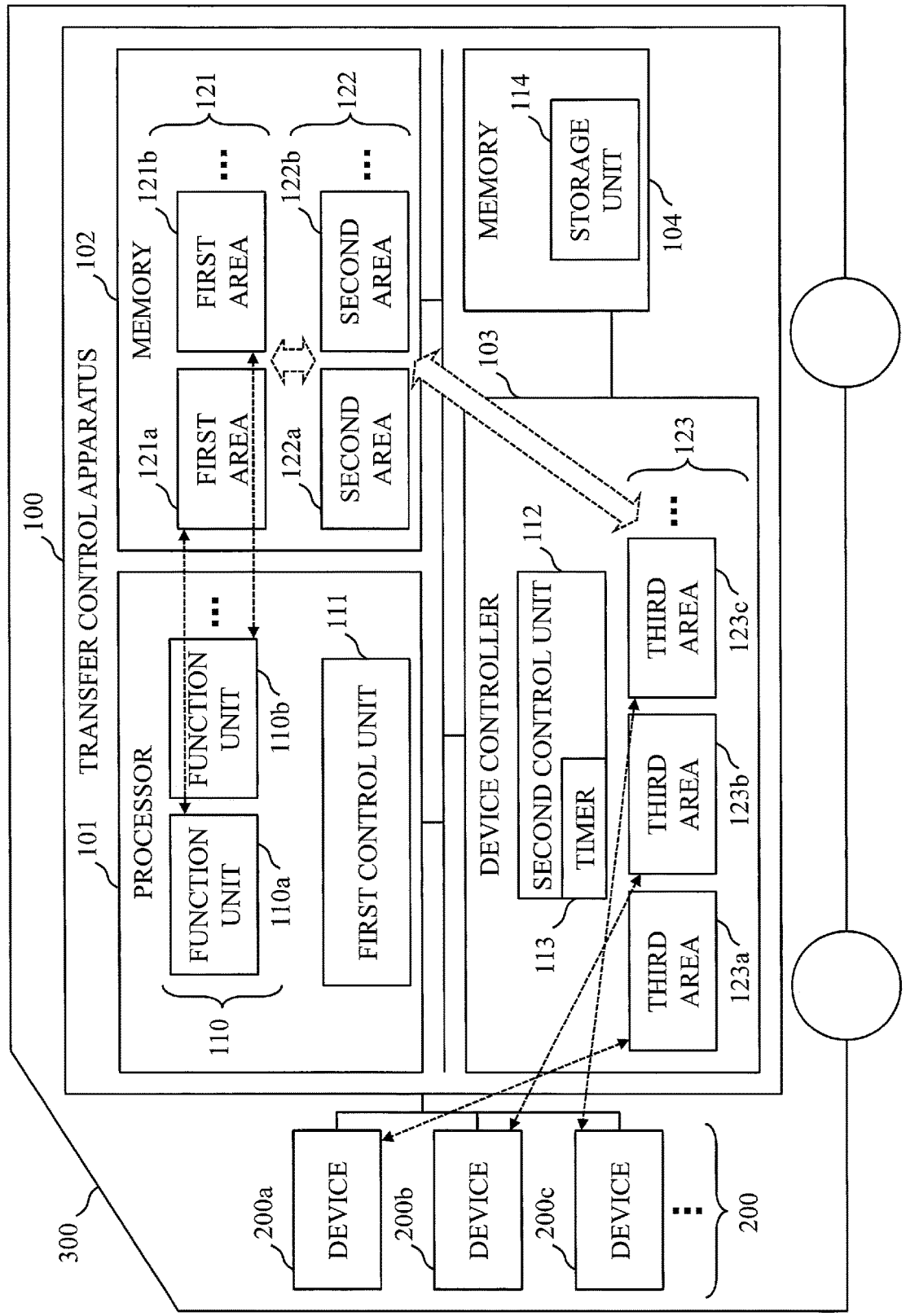
FIG. 8 is a block diagram illustrating a configuration and an installation example of a transfer control apparatus according to a second embodiment.

With reference to FIG. 8, the configuration of the transfer control apparatus 100 being the device according to the present embodiment will be described.

The transfer control apparatus 100 is a computer as in the first embodiment. The transfer control apparatus 100 is equipped with a processor 101, a memory 102 and a device controller 103 as in the first embodiment, and further equipped with another memory 104 as a hardware component.

The transfer control apparatus 100 is equipped with a plurality of function units 110, a first control unit 111 and a second control unit 112 as in the first embodiment, and further equipped with a storage unit 114 as a functional element.

The functions of the storage unit 114 are realized by the memory 104.

The transfer control apparatus 100 is equipped with a plurality of first areas 121, a plurality of second areas 122 and a plurality of third areas 123 as areas to store device data, as in the first embodiment.

An example of the second areas 122 is illustrated in FIG. 9.

In the present example, the second areas 122 are provided for respective combinations of a transfer time and a device ID. The second areas 122 are, specifically, areas to store device data in a table consisting of a column wherein device IDs are stored, a column wherein transfer times are stored, and a column wherein the device data is stored.

In the present example, the transfer times are managed in an arbitrary number of stages, not only in four stages of "t1" through "t4." This is because even the number of stages of transfer times changes, there is no necessity to change the table format, specifically, the number of columns.

Figure 10:
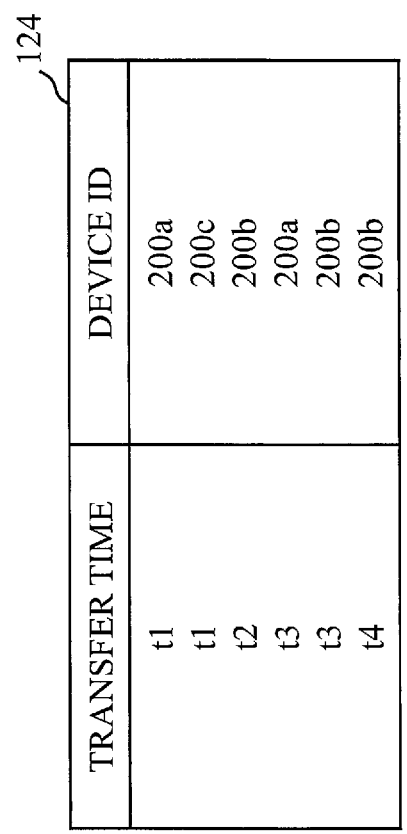
FIG. 10 is a table illustrating an example of a definition stored in a storage unit of the transfer control apparatus according to the second embodiment.

FIG. 10 illustrates an example of a definition 124 stored in a storage unit 114.

The storage unit 114 stores the definition 124 of the correspondence relation between the transfer times and the device IDs. In the present example, the definition 124 is a table consisting of a column wherein transfer times are stored, and a column wherein device IDs are stored.

In the present embodiment, the device controller 103 is preferably a hardware component that can be reconfigured, such as an FPGA, etc.

* Explanation of Operation *

Hereinafter, the operation of the transfer control apparatus 10 being the device according to the present embodiment will be discussed. The operation of the transfer control apparatus 100 corresponds to a transfer control method according to the present embodiment.

Since the operation of the processor 101 is approximately the same as that in the first embodiment, the explanation is omitted.

Figure 11:
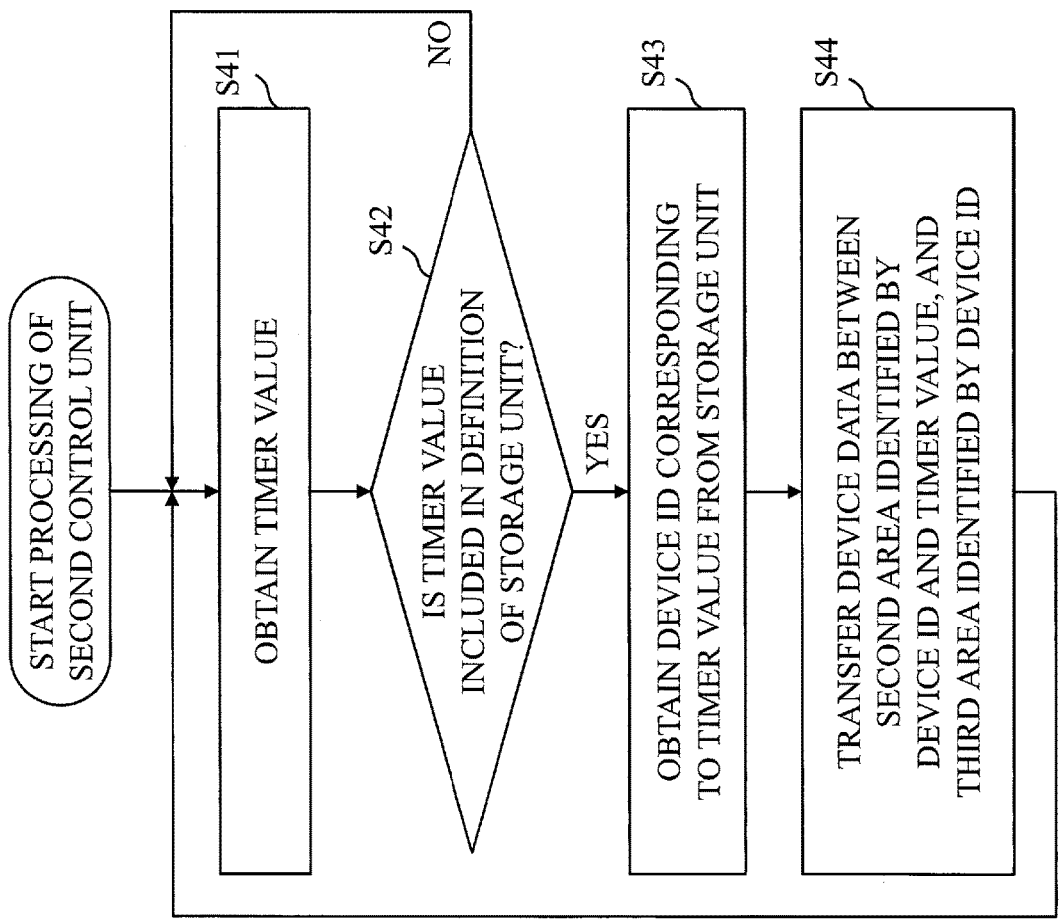
FIG. 11 is a flowchart illustrating an operation of a second control unit of the transfer control apparatus according to the second embodiment.

With reference to FIG. 11, the operation of the device controller 103, especially, the operation of the second control unit 112 will be described.

In a step S41, the second control unit 112 obtains a timer value indicating the time notified by the timer 113.

In a step S42, the second control unit 112 judges whether the time of the timer value obtained in the step S41 is included as a transfer time in the definition 124 stored in the storage unit 114.

When the time of the timer value is included in the definition 124 in the step S42, i.e., when a transfer time being same as the time notified by the timer 113 is included in the definition 124, the second control unit 112 obtains a device ID corresponding to that transfer time from the definition 124 in a step S43.

In a step S44, the second control unit 112 transfers device data between a second area 122 corresponding to the combination of the transfer time being same as the time notified by the timer 113 and the device ID obtained in the step S43, and a third area 123 corresponding to the device ID obtained in the step S43.

When the time of the timer value is not included in the definition 124 in the step S42, i.e., when a transfer time being same as the time notified by the timer 113 is not included in the definition 124, the flow returns to the step S41.

* Explanation of Effect of Embodiment *

In the present embodiment, by changing the definition 124 stored in the storage unit 114, it is possible to change, and increase or decrease variations of transfer times.

* Other Configuration *

In the present embodiment, similarly to the first embodiment, the functions of the plurality of function units 110 and the first control unit 111 are realized by software; however, as in the variation example in the first embodiment, the functions of the plurality of function units 110 and the first control unit 111 may be realized by a hardware component. Otherwise, the functions of the plurality of function units 110 and the first control unit 111 may be realized by a combination of software and a hardware component. The functions of the second control unit 112 may be realized by a combination of software and a hardware component.

The above describes the embodiments of the present invention; however, more than one of those embodiments may be combined and implemented. Otherwise, any one of or some of those embodiments may be partially implemented. Specifically, out of those described as "units" in the description of those embodiments, any one of the "units" or an arbitrary combination of some "units" may be employed. Note that the present invention is not limited to those embodiments, and various alterations can be made as needed.

REFERENCE SIGNS LIST

100: transfer control apparatus; 101: processor; 102: memory; 103: device controller; 104: memory; 109: processing circuit; 110, 110a, 110b: function unit; 111: first control unit; 112: second control unit; 113: timer; 114: storage unit; 121, 121a, 121b: first area; 122, 122a, 122b, 122c, 122d, 122da, 122db, 122dc: second area; 123, 123a, 123b, 123c: third area; 124: definition; 200, 200a, 200b, 200c: device; 300: vehicle

The invention claimed is:

1. A transfer control apparatus comprising:
   processing circuitry
      to have a plurality of functions to specify a transfer time of device data being any one of data input into a device located outside, and data output from the device, and make a transfer request of the device data, and
      to transfer, in response to a transfer request from a request source being any one of the plurality of functions, the device data between a first memory area of the transfer control apparatus corresponding to the request source out of a plurality of first memory areas provided for and accessed by respective ones of the plurality of functions, and a second memory area of the transfer control apparatus corresponding to a transfer time specified by the request source out of a plurality of second memory areas provided for respective transfer times specified by the plurality of functions; and
   a device controller to include a timer to notify a time, and transfer, when a second memory area corresponding to a transfer time being same as the time notified by the timer exists, the device data between that second memory area, and at least one third memory area of a device controller accessed by the device,
   wherein the plurality of functions specify a device ID to identify the device when making a transfer request of the device data,
   wherein the plurality of second memory areas are provided for respective combinations of a transfer time and a device ID,
   wherein the processing circuitry transfers, in response to the transfer request from the request source, the device data between the first memory area corresponding to the request source, and the second memory area corresponding to a combination of the transfer time and the device ID specified by the request source,
   wherein the at least one third memory area is provided for each device ID, and
   wherein the device controller transfers, when the second memory area corresponding to the transfer time being same as the time notified by the timer exists, the device data between that second memory area, and a third memory area corresponding to a same device ID as that second memory area.

2. The transfer control apparatus as defined in claim 1,
   wherein the device controller transfers, when the second memory area corresponding to the transfer time being same as the time notified by the timer exists, data that is output from the device and stored in the at least one third memory area as the device data, from the at least one third memory area, to that second memory area,
   wherein the processing circuitry transfers, in response to the transfer request from the request source, the device data from the second memory area corresponding to the transfer time specified by the request source, to the first memory area corresponding to the request source, and
   wherein the request source obtains the device data from the first memory area corresponding to the request source.

3. The transfer control apparatus as defined in claim 1,
   wherein the request source stores the data input into the device as the device data in the first memory area corresponding to the request source,
   wherein the processing circuitry transfers, in response to the transfer request from the request source, the device data from the first memory area corresponding to the request source, to the second memory area corresponding to the transfer time specified by the request source, and
   wherein the device controller transfers, when the second memory area corresponding to the transfer time being same as the time notified by the timer exists, the device data from that second memory area, to the at least one third memory area.

4. The transfer control apparatus as defined in claim 1, further comprising a memory to store a definition of a correspondence relation between a transfer time and a device ID,
   wherein when the transfer time being same as the time notified by the timer is included in the definition stored in the memory, the device controller obtains a device ID corresponding to that transfer time from the definition, and transfers the device data between the second memory area corresponding to a combination of that transfer time and the device ID obtained, and a third memory area corresponding to the device ID obtained.

5. A vehicle whereon the transfer control apparatus as defined in claim 1, and the device are mounted.

6. A transfer control method comprising:
   by a request source being any one of a plurality of functions, specifying a transfer time of device data being any one of data input into a device located outside, and data output from the device, and making a transfer request of the device data;
   transferring, in response to the transfer request from the request source, the device data between a first memory area of a transfer control apparatus corresponding to the request source out of a plurality of first memory areas provided for and accessed by respective ones of the plurality of functions, and a second memory area of the transfer control apparatus corresponding to the transfer time specified by the request source out of a plurality of second memory areas provided for respective transfer times specified by the plurality of functions; and
   transferring, when a second memory area corresponding to a transfer time being same as a time notified by a timer exists, the device data between that second memory area, and at least one third memory area of a device controller accessed by the device, wherein the plurality of functions specify a device ID to identify the device when making a transfer request of the device data, wherein the plurality of second memory areas are provided for respective combinations of a transfer time and a device ID, wherein the processing circuitry transfers, in response to the transfer request from the request source, the device data between the first memory area corresponding to the request source, and the second memory area corresponding to a combination of the transfer time and the device ID specified by the request source, wherein the at least one third memory area is provided for each device ID, and wherein the device controller transfers, when the second memory area corresponding to the transfer time being same as the time notified by the timer exists, the device data between that second memory area, and a third memory area corresponding to a same device ID as that second memory area.

\* \* \* \* \*